United States Patent
Shigekawa

(10) Patent No.: US 7,745,760 B2
(45) Date of Patent: Jun. 29, 2010

(54) METHOD OF MANUFACTURING SOLDERING IRON

(75) Inventor: Tomohiro Shigekawa, Fukuyama (JP)

(73) Assignee: Taiyo Electric Ind. Co., Ltd., Fukuyama-shi, Hiroshima-ken (JP)

( * ) Notice: Subject to any disclaimer, the term of this patent is extended or adjusted under 35 U.S.C. 154(b) by 238 days.

(21) Appl. No.: 11/848,334

(22) Filed: Aug. 31, 2007

(65) Prior Publication Data

US 2008/0010808 A1 Jan. 17, 2008

Related U.S. Application Data

(62) Division of application No. 11/284,708, filed on Nov. 22, 2005, now Pat. No. 7,291,809.

(30) Foreign Application Priority Data

Nov. 25, 2004 (JP) ............ P2004-340157

(51) Int. Cl.
*H05B 1/00* (2006.01)
(52) U.S. Cl. ............ 219/229; 219/230; 219/231
(58) Field of Classification Search ............ 219/229, 219/230, 231, 237, 241, 544; 29/552; 228/51, 228/54

See application file for complete search history.

(56) References Cited

U.S. PATENT DOCUMENTS

| | | |
|---|---|---|
| 3,536,890 A | 10/1970 | Hombrecher |
| 3,596,057 A | 7/1971 | Arntz |
| 3,646,577 A | 2/1972 | Ernst |
| 3,699,306 A | 10/1972 | Finch |
| 4,055,744 A | 10/1977 | Fortune |
| 4,074,110 A | 2/1978 | Slaughter |
| 4,468,555 A | 8/1984 | Adachi |
| 4,621,251 A | 11/1986 | Keefe |
| 5,122,637 A | 6/1992 | Bottorff |
| 5,335,310 A | 8/1994 | Novy |
| 5,406,053 A | 4/1995 | Masreliez |
| 5,683,603 A | 11/1997 | Fortune |
| 5,837,973 A | 11/1998 | Tamura |
| 5,945,015 A | 8/1999 | Feinler |

(Continued)

FOREIGN PATENT DOCUMENTS

GB 1428123 3/1976

(Continued)

OTHER PUBLICATIONS

European Search Report of Application EP05257169.2.

(Continued)

*Primary Examiner*—Tu B Hoang
*Assistant Examiner*—Vinod D Patel
(74) *Attorney, Agent, or Firm*—Matthew B. Dernier, Esq.; Gibson & Dernier LLP

(57) ABSTRACT

A soldering iron provided with a soldering tip that melts solder at a distal end, having inside said soldering tip a substantially cylindrical insertion fit recess portion extending from a proximal end of the soldering tip to the distal end, opening at the proximal end, and a heater formed into a coil shape and whose surface is covered with an insulating oxide film being fittingly inserted into the insertion fit recess portion.

3 Claims, 3 Drawing Sheets

U.S. PATENT DOCUMENTS

| | | | |
|---|---|---|---|
| 6,087,631 | A | 7/2000 | Miyazaki |
| 6,215,104 | B1 | 4/2001 | Kurpiela |
| 6,369,359 | B1 | 4/2002 | Morrison |
| 6,386,423 | B1 | 5/2002 | Adler |
| 6,786,386 | B2 | 9/2004 | Miyazaki |
| 6,818,862 | B2 | 11/2004 | Uetani |
| 6,972,396 | B2 | 12/2005 | Miyazaki |
| 7,019,269 | B2 | 3/2006 | Okuda |
| 7,030,339 | B2 | 4/2006 | Nagase |
| 2004/0112893 | A1 | 6/2004 | Okuda |
| 2004/0195228 | A1 | 10/2004 | Konishi |

FOREIGN PATENT DOCUMENTS

| | | |
|---|---|---|
| JP | H2-144263 | 12/1990 |
| JP | 03008566 | 1/1991 |
| JP | 11281601 | 10/1999 |
| JP | 2002-270340 | 9/2002 |
| JP | 2003251461 | 9/2003 |
| JP | 2004-017060 | 1/2004 |
| JP | 20040195228 | 10/2004 |
| WO | 03017726 | 2/2003 |

OTHER PUBLICATIONS

Office Action to corresponding Korean Patent Application No. 10-2005-0111667, dated Nov. 10, 2006, 3 pages.

First Office Action for corresponding CN application No. 200510123771.0 dated Aug. 1, 2008.

Office Action for corresponding Japanese Patent Application 2004-340157, dated Jul. 14, 2009.

Office Action for Patent 7,291,809 (U.S. Appl. No. 11/284,708), dated: May 14, 2007, to which priority is claimed under 35 U.S.C. § 120.

Office Action for Patent 7,291,809 (U.S. Appl. No. 11/284,708), dated: Jan. 4, 2007, to which priority is claimed under 35 U.S.C. § 120.

Office Action for Patent 7,291,809 (U.S. Appl. No. 11/284,708), dated: Jun. 2, 2006, to which priority is claimed under 35 U.S.C. § 120.

Notice of Allowance for corresponding Japanese application 2004-340157, dated: Dec. 8, 2009.

METHOD OF MANUFACTURING SOLDERING IRON

CROSS REFERENCE TO RELATED APPLICATIONS

This application is a divisional of U.S. patent application Ser. No. 11/284,708 filed on Nov. 22, 2005, the entire disclosure of which is hereby incorporated by reference.

BACKGROUND OF THE INVENTION

1. Field of the Invention

This invention relates to a soldering iron and a method of manufacturing the soldering iron.

2. Description of Related Art

Soldering iron tips have been provided in which a thermally conductive material is formed in the shape of a cone with a heater being housed therein (refer to Japanese Unexamined Application, First Publication No. 2004-17060). The heater generally includes a comparatively high-resistance wire wound into the shape of a coil.

In recent surface-mount technology involving the soldering of extremely small LSIs and the like onto a substrate, parts to be soldered and parts not to be fused are disposed together within very close proximity. For this reason, there have been proposed soldering irons constructed to be extremely small (hereafter, an "extremely small soldering iron") so that the soldering tip thereof can suitably reach within a very small region when performing such soldering. The inside of such an extremely small soldering iron is constituted similarly to an ordinary size soldering iron. To wit, built in the extremely small soldering iron as well is a heater formed by wire material having resistance wound into the shape of a coil.

Since the soldering tip itself of the aforementioned extremely small soldering iron is constituted to be very small, the spacing between adjacent portions of the coiled wire material in the heater is considerably smaller than in an ordinary size soldering iron. For that reason, there has been the problem of adjacent wires electrically shorting or breaking by contact. Moreover, increasing the spacing between adjacent turns of the coiled wire gives rise to the problem of heat being transmitted to the grip portion of the soldering iron.

SUMMARY OF THE INVENTION

The present invention was achieved in view of the above circumstances, and provides a soldering iron that is constituted to be of an extremely small size yet easy to use by suitably preventing electrical troubles including shorting, heating quickly, and suitably maintaining a temperature suitable for soldering work and a manufacturing method of the soldering iron.

In order to solve the aforementioned problems, the present invention provides the following soldering iron and manufacturing method thereof.

The soldering iron of the present invention is a soldering iron including: a soldering tip that melts solder at a distal end; a substantially cylindrical insertion fit recess portion extending from a proximal end of the soldering tip to the distal end inside the soldering tip and opening at the proximal end; and a heater formed into a coil shape and surface thereof is covered with an insulating oxide film being fittingly inserted into the insertion fit recess portion.

The heater that heats the soldering tip in the soldering iron is formed into the shape of a coil and the surface of the coiled heater is covered with an insulating oxide film. To wit, the wire that generates heat by its resistance is insulated from electrical contact with itself by the insulating oxide film. Electrical shorting is thereby avoided even if the wire makes mutual contact, thus allowing the wire formed in a coil shape to be disposed with the spacing therebetween narrowed. In addition, electrical problems such as wire breakage are also easily avoided by means of the insulating oxide film.

Accordingly, in the heater built in the soldering tip of the present invention, the spacing between the adjacent turns of the coiled wire disposed in the shape of a coil may be made still smaller. This enables the size of the heater to be constituted small, so that the soldering tip may be constituted extremely small. In addition, since the spacing between the turns of the wire is narrowed, the amount of heating per unit volume also increases, thereby enabling prompt heating of the soldering tip. Furthermore, since the size of the heater is small, the portion heated by the heater may be limited to the soldering tip. That is, since heat is hindered from being transmitted to the grip portion of the soldering iron, it is not uncomfortable to hold the grip portion of the soldering iron for a long time when performing soldering work, and so a soldering iron suitable for soldering is obtained.

In this soldering iron, it is preferable that the material of the wire constituting the heater is a chromium iron-base metal containing aluminum.

In this case, when an insulating oxide film that covers the above-mentioned wire is formed, the insulating oxide film may be suitably formed. To wit, for chromium iron-base metal containing aluminum such as Kanthal wire, when heated for a prescribed time at 1100 to 1200° C., high-temperature oxidation of the contained aluminum occurs, resulting in an oxide film (alumina film) being suitably formed on the surface thereof. The aluminum oxide (alumina) which forms the oxide film is electrically insulating. Therefore, the insulating oxide film is formed so as to suitably cover the wire, so that the aforementioned desired operational advantage may be preferably attained.

In this soldering iron, it is preferable that the insertion fit recess portion includes a heater insertion fit portion provided at the proximal end side of the soldering tip and a temperature sensor insertion fit portion provided at the distal end side of the soldering tip and having an inner diameter smaller than the inner diameter of the heater insertion fit portion, and wherein a temperature sensor for measuring temperature is fittingly inserted into the temperature sensor insertion fit portion and makes contact with the inner periphery of the temperature sensor insertion fit portion.

In this case, the temperature of a soldering tip may be desirably measured. Therefore, when the soldering tip is heated by the heater fittingly inserted into the heater insertion fit portion, electric power suitable for the heater may be supplied so that the soldering tip may be maintained at a desired temperature. Accordingly, a soldering iron may be obtained that may maintain a suitable temperature desirable for soldering when performing soldering work. Consequently, soldering work is easily performed.

In this soldering iron, it is preferable that a cylinder with an outer diameter smaller than the inner diameter of the temperature sensor insertion fit portion is fittingly inserted in the temperature sensor insertion fit portion, and the temperature sensor is sandwiched between the outer periphery of the cylinder and the inner periphery of the temperature sensor insertion fit portion.

In this case, since the temperature sensor is fixedly held favorably and may make secure contact with the inner periphery of the temperature sensor insertion fit portion, it may desirably measure the temperature of the soldering tip. Therefore, when the soldering tip is heated by the heater fittingly inserted into the heater insertion fit portion, electric power suitable for the heater may be supplied so that the soldering tip may be maintained to a desired temperature. Accordingly, a soldering iron may be obtained that may maintain a suitable temperature desirable for soldering when performing soldering work. Consequently, soldering work is easily performed.

The method of manufacturing the soldering iron of the present invention is a manufacturing method of a soldering iron provided with a soldering tip that melts solder at a distal end, having the steps of: providing a substantially cylindrical insertion fit recess portion extending from a proximal end of the soldering tip to the distal end inside the soldering tip and opening at the proximal end; constituting a heater by forming chromium iron-base metal containing aluminum into a coil shape; subjecting the heater by heating in a furnace at a prescribed temperature for a prescribed time; and fittingly inserting the high-temperature oxidized heater into the insertion fit recess portion; and providing a temperature sensor that is abutted against the inner periphery of the insertion fit recess portion.

In this case, the wire that generates heat by its resistance is insulated from mutual electrical contact by the insulating oxide film. Electrical shorting is thereby avoided even if the adjacent turns of the wire make mutual contact, thus allowing the coiled wire to be disposed with the spacing therebetween narrowed. In addition, electrical problems such as wire breakage are also easily avoided with the insulating oxide film. Moreover, since the temperature sensor is provided abutting against the inner periphery of the insertion fit recess portion, the temperature of the soldering tip may be desirably measured.

Accordingly, in the heater built in the soldering tip manufactured thus, the spacing between the adjacent turns of the wire disposed in a coil shape may be made still smaller. This enables the size of the heater to be constituted small, so that the soldering tip may be constituted extremely small. In addition, since the spacing between the adjacent turns of the wire is narrowed, the amount of heating per unit volume also increases, and so the soldering tip may be quickly heated. Furthermore, since the size of the heater is small, the portion heated with the heater may be limited to the soldering tip. That is, since heat is hindered from being transmitted to the grip portion of the soldering iron, it is not uncomfortable to hold the grip of the soldering iron for a long time when performing soldering work, and so a suitable soldering iron for work is obtained. Moreover, the temperature of the soldering tip is maintained at the desired temperature by measuring temperature performed by the temperature sensor, so that a soldering iron may be obtained that may maintain a suitable temperature desirable for soldering when performing soldering work.

According to the soldering iron of the present invention and the manufacturing method thereof, a soldering iron that is constituted to be of an extremely small size yet easy to use by suitably preventing electrical troubles including shorting, heating quickly and suitably maintaining a temperature suitable for soldering work and a manufacturing method of the soldering iron may be obtained.

DETAILED DESCRIPTION OF THE INVENTION

Figure 1:
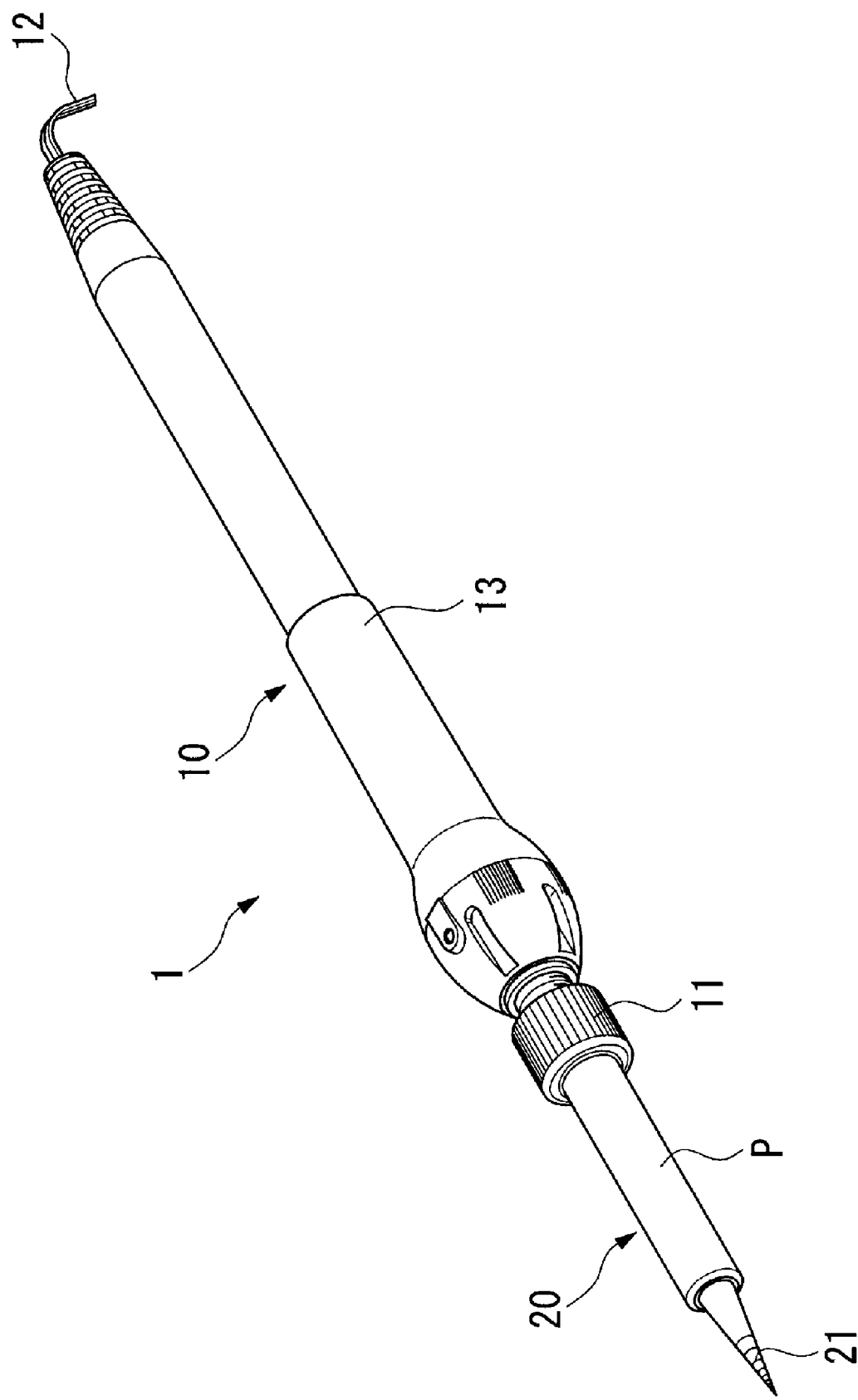
FIG. 1 is a perspective view of the soldering iron of the present invention.
Figure 2:
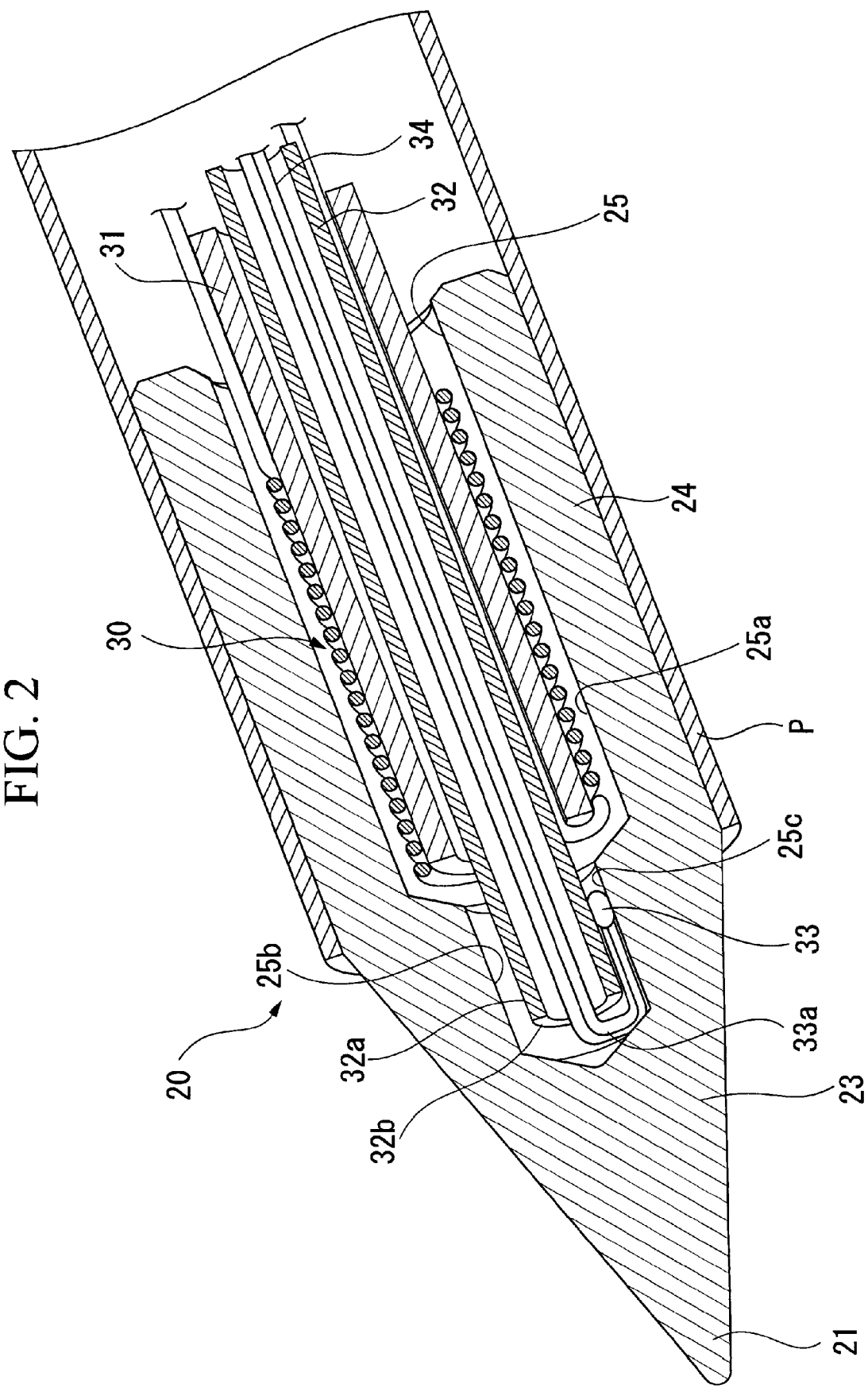
FIG. 2 is a cross-sectional perspective view of the soldering tip.
Figure 3:
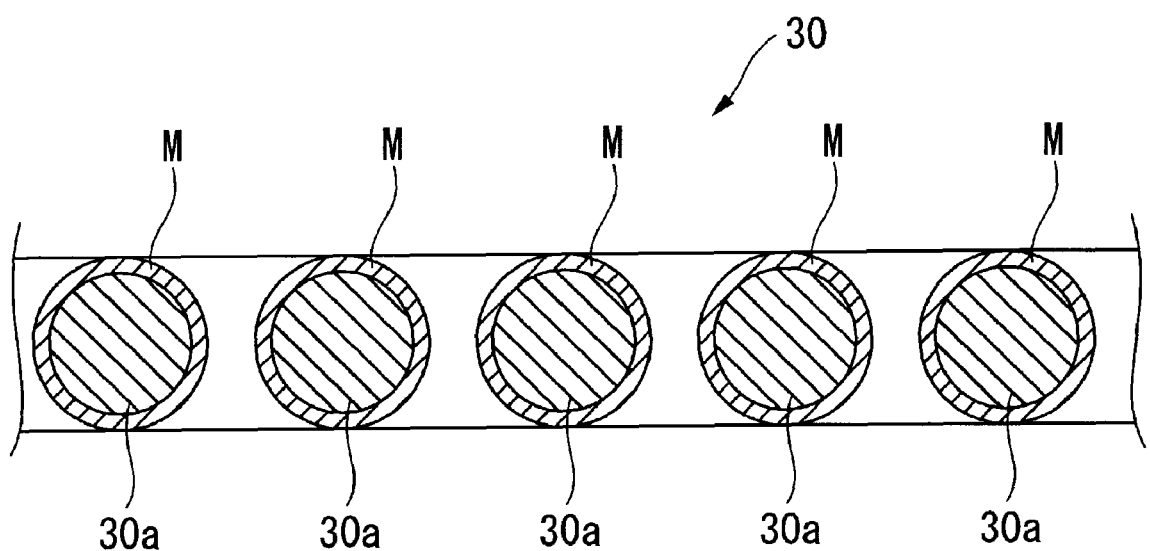
FIG. 3 is a schematic cross-sectional view of the coil diameter direction of the heater.

Below, the embodiment of the soldering iron of the present invention and the manufacturing method thereof are explained referring to the drawings. FIG. 1 is a perspective view of the soldering iron of the present invention, FIG. 2 is a cross-sectional perspective view of the soldering tip, and FIG. 3 is a schematic cross-sectional view of the coil diameter direction of the heater.

A soldering iron 1 shown in FIG. 1 melts solder at a distal end thereof, and is used for the purpose of soldering or removing attached solder. The soldering iron 1, roughly divided, has a soldering tip 20 equipped with a bit 21 for melting solder, and a body (holding shaft) 10 connected with a proximal end of the soldering tip 20.

The soldering tip 20 is joined to the distal end of the body 10 via an engaging member 11 at the distal end thereof, and a cord 12 equipped with a plug (not shown) for connection to a power supply is provided at the proximal end of the body 10. The middle part of the body 10 is constituted as a grip portion 13 for holding the soldering iron 1 by hand when performing soldering work.

A controller device (not shown) equipped with an isolation transformer is built in the body 10. The isolation transformer transforms the voltage of the power supplied from the power supply to a lower voltage while isolating the power supply. Specifically, it transforms 100V AC supplied from the power supply to 24V AC for a heater 30 provided in the solder tip 20, and to 10V AC for driving a temperature controller while isolating the power supply. The temperature controller which is provided in the solder tip 20 is connected to a temperature sensor 33 which is provided in the solder tip 20 through a cable 34 as explained hereinbelow. Based on feedback from this temperature sensor 33, the temperature controller switches the supply of the 24V AC to the heater 30 to either ON or OFF. By the temperature controller switching the heater 30, the temperature of the soldering tip 20 is adjusted to be maintained at a prescribed temperature. The controller device is not limited to being installed inside of the body 10, and may be provided outside of the body 10 as a controller box.

Next, the soldering tip 20 of the soldering iron 1 will be explained.

As shown in FIG. 2, the soldering tip 20 includes the bit 21 and a stainless pipe P. The bit is formed of a material excellent in thermal conductivity and is constituted so that a conical portion 23 formed in a conical shape so as to project toward the bit 21 and a cylindrical portion 24 formed in a cylindrical shape and extending to the proximal end while maintaining the diameter of the bottom of the conical portion 23 are integrated. The stainless pipe is fixed to the outer periphery of the cylindrical portion 24 by press fitting or the like. An insertion fit recess portion 25, which is a cylindrical cavity, is formed in the bit 21 from the cross-sectional circular center of the proximal end toward the distal end.

Said insertion fit recess portion 25 is constituted so that a heater insertion fit portion 25a provided on the proximal end side and a temperature sensor insertion fit portion 25b provided on the distal end side are continuous. Specifically, the heater insertion fit portion 25a is formed inside of the cylindrical portion 24, being constituted as a substantially cylindrical cavity with the cross-sectional circular diameter thereof held constant. Said temperature sensor insertion fit portion 25b is formed inside of the conical portion 23, being a substantially cylindrical cavity with the cross-sectional circular diameter thereof held constant, and the inner diameter thereof being smaller than the inner diameter of the heater insertion fit portion 25a.

Next, each member fitted into the heater insertion fit portion 25a and the temperature sensor insertion fit portion 25b will be explained.

The heater 30 is fitted into the heater insertion fit portion 25a. The heater 30 is formed into a coil shape by Chromium iron-base metal containing aluminum represented by Kanthal wire, for example. Specifically, the heater 30 is formed by coiling Kanthal wire by winding it the desired number of times around a core material not shown and then heating it for the prescribed time in a furnace heated to the prescribed temperature (for example, 1100 to 1200° C.) to subject it to high-temperature oxidation. Thus, when high-temperature oxidation of the heater 30 is carried out, as shown in the schematic cross-sectional view of the coil diameter direction in FIG. 3, a black oxide film M is formed on the surface of a wire (for example, Kanthal wire) 30a of this heater 30 so as to cover the wire 30a. This black oxide film M is an aluminum oxide (alumina) formed by oxidizing the aluminum contained in the Kanthal wire. Since the aluminum oxide (alumina) is electrically insulating, the surface of the heater 30 is covered with the insulating oxide film M.

A first cylindrical member 31 with a cylindrical cavity formed thereinside and constituted with an outer diameter slightly smaller than the inner diameter of the heater formed in a coiled shape is inserted inside the heater 30. The coiled shape portion of said heater 30 is constituted to a length to be suitably stored in the heater insertion fit portion 25a. The outer diameter of the first cylindrical member 31 is comparatively larger than the inner diameter of the temperature sensor insertion fit portion 25b. In the state of the first cylindrical member 31 and a second cylindrical member 32 explained hereinbelow are inserted, the heater 30 is fitted inside the heater insertion fit portion 25a. Since the outer diameter of the first cylindrical member 31 is comparatively larger than the inner diameter of the temperature sensor insertion fit portion 25b, the distal ends of the heater 30 and the first cylindrical member 31 fittingly inserted in the soldering tip 20 suitably stop at the distal end of the heater insertion fit portion 25a.

Said first cylindrical member 31 is formed of ceramics having excellent electrically insulating properties and heat resistance. As for the wire 30a which forms the heater 30, the end portion on the side of the proximal end is drawn along the outer periphery of the first cylindrical member 31 to the outside of the soldering tip 20 (the bit 21). On the other hand, the side of the distal end of the wire 30a passes through the inside of the first cylindrical member 31 and is drawn from the proximal end to the outside of the soldering tip 20 (the bit 21). Both ends of the wire 30a drawn to the outside of the soldering tip 20 are thereby electrically connected to each component provided inside the body 10.

The second cylindrical member 32 is provided inserted inside of the first cylindrical member 31. Said second cylindrical member 32 is constituted in a cylindrical shape capable of being fittingly inserted in the temperature sensor insertion fit portion 25b mentioned above, and is equivalent to a cylinder in this invention. Specifically, the outer diameter of the second cylindrical member 32 is smaller than the inner diameter of the first cylindrical member 31 and the inner diameter of the temperature sensor insertion fit portion 25b. The second cylindrical member 32 is fittingly inserted until the temperature sensor insertion fit portion 25b. Said second cylindrical member 32, similarly to the above-mentioned first cylindrical member 31, is formed of ceramics having excellent electrically insulating properties and heat resistance.

The temperature sensor 33 is provided at the distal end 21 side of the second cylindrical member 32. Specifically, the ball-shaped temperature sensor 33, whose resistance or thermoelectromotive force changes depending on temperature, is provided so as to be closely sandwiched between an inner periphery 25c of the temperature sensor insertion fit portion 25b and an outer periphery 32a of the second cylindrical member 32.

The temperature sensor 33 is connected to the cable 34 that is inserted inside of the second cylindrical member 32 from a bend portion 33a. That is, the temperature sensor is passed through the inside of the second cylindrical member 32 from the distal end side and drawn out to the proximal end side. In order to distinguish both directions of the cable 34, a glass coating is applied to one or both cables, and both cables are electrically connected to each component provided inside the body 10. The bend portion 33a of the cable 34 is formed by the bending of a connection region projecting from a distal end portion 32b of the second cylindrical member 32. Therefore, the temperature sensor 33 suitably makes contact with the inner periphery 25c of the temperature sensor insertion fit portion 25b. In addition, as the bend portion 33a is hooked over the distal end portion 32b of the second cylindrical member 32, the position of the temperature sensor 33 is decided.

In order to make the second cylindrical member 32 and the temperature sensor 33 fit in the temperature sensor insertion fit portion 25b, first, the cable 34 is drawn through the inside of the second cylindrical member 32 from the distal end portion 32b, and the temperature sensor 33 is formed on the cable 34. Then, the cable 34 on which the temperature sensor 33 is formed is bent so that the temperature sensor 33 may contact the outer periphery of the distal end portion 32a of the second cylindrical member 32. The distal end portion 32a of the second cylindrical member 32 is then inserted in the temperature sensor insertion fit portion 25b. Said temperature sensor 33 is thus provided to preferably contact the inner periphery of the temperature sensor insertion fit portion 25b. The soldering tip 20 constituted as mentioned above is then attached to the body 10, to make the soldering iron 1 according to the present invention.

Before bending the cable 34 so that the temperature sensor 33 may touch the outer periphery of the distal end portion 32a of the second cylindrical member 32, when the second cylindrical member 32 is inserted in the inside of the first cylindrical member 31, the heater 30, the first cylindrical member 31, the second cylindrical member 32, and the temperature sensor 33 may be simultaneously fittingly inserted in the insertion fit recess portion 25 mentioned above. Consequently, assembling time is shortened and assembling work is streamlined.

As explained above, the inside of the soldering tip 20 of this soldering iron 1 is constituted by a concentric stacked structure. To wit, a stacked structure is made in which the stainless pipe P and the bit 21 are disposed at the outermost circumference, the soldering tip 20 is one level inward, the heater 30 is the next level inward, the first cylindrical member 31 is the next level inward, the second cylindrical member 32 is the next level inward and the cable 34 is disposed thereinside. As described above, the end portion of the heater 30 at the distal end side of the soldering tip 20 is disposed between the first cylindrical member 31 and the second cylindrical member 32 so as to be drawn out to the proximal end side. In this way, a layered structure enables a more compact arrangement.

When the heater 30 together with the first cylindrical member 31, the second cylindrical member 32, the temperature sensor 33, and the cable 34 are fittingly inserted in the insertion fit recess portion 25 as described above, a suitable adhesive (cement) may be injected into the insertion fit recess portion 25. Injecting adhesive in this way fixes the members including the above-mentioned heater 30 in the insertion fit recess portion 25, and so is more desirable.

The soldering iron 1 constituted in this way exhibits the following operational advantages.

Namely, the heater 30 which heats the soldering tip 20 is formed into a coiled shape, and the surface of the heater 30 is covered with the insulating oxide film M. To wit, the wire 30a that generates heat by its resistance is insulated from mutual electrical contact by the insulating oxide film M. This enables wire 30a formed into a coiled shape to be disposed with narrow spacing between the turns of the coil, and so even if there is mutual contact, electrical shorting is avoided. In addition, electrical problems such as wire breakage are also easily avoided with the insulating oxide film M.

Therefore, compared to the case where the insulating oxide film is not employed for the heater 30 built into the soldering tip 20, the spacing between the turns of the wire arranged in a coil may be made still smaller. This enables the size of the heater 30 to be constituted small, so that the soldering tip 20 may be constituted extremely small. In addition, since the spacing between the turns of the wire 30a is narrowed, the amount of heating per unit volume also increases, thereby enabling prompt heating of the soldering tip 20. Furthermore, since the size of a heater 30 is small, the portion heated with the heater 30 may be limited to the soldering tip 20 (the bit 21). That is, since heat is hindered from being transmitted to the body 10 including the grip portion 13 of the soldering iron 1, it is not uncomfortable to hold the grip portion 13 of the soldering iron for a long time when performing soldering work, and so a soldering iron suitable for soldering work is obtained.

Moreover, Kanthal wire, which may preferably form an insulating oxide film M that covers the aforementioned wire 30a, is used in the heater 30 of this soldering iron 1. When Kanthal wire is heated for a prescribed time at 1100 to 1200° C., high-temperature oxidation of the contained aluminum occurs, resulting in an oxide film (alumina film) being suitably formed on the surface thereof. Aluminium oxide (alumina) has electrically insulating properties. Therefore, an insulating oxide film M is preferably formed so as to cover the wire 30a, and the aforementioned desired operational advantage may be preferably attained.

In the soldering iron 1, the inner diameter of the temperature sensor insertion fit portion 25b provided at the bit 21 of the soldering tip 20 is set to be smaller than the inner diameter of the heater insertion fit portion 25a provided at the proximal end side of the soldering tip 20. When the temperature sensor 33 which measures temperature is disposed in the temperature sensor insertion fit portion 25b, the temperature sensor 33 may be made to favorably contact the inner periphery 25c of the temperature sensor insertion fit portion 25b. This enables the temperature of the soldering tip 20 (the tip 21) to be desirably measured. Therefore, when the soldering tip 20 is heated with the heater 30 fittingly inserted into the heater insertion fit portion 25a, electric power suitable for the heater 30 may be supplied so that the soldering tip 20 so as to be maintained at a desired temperature. Accordingly, a soldering iron may be obtained that may maintain a suitable temperature desirable for soldering when performing soldering work. Consequently, soldering work is easily performed.

In this soldering iron 1, the second cylindrical member 32 having an outer diameter smaller than the inner diameter of the temperature sensor insertion fit portion 25b allowing insertion of the temperature sensor 33 is fittingly inserted in said temperature sensor insertion fit portion 25b. The temperature sensor 33 is thereby sandwiched between the outer periphery 32a of the second cylindrical member 32 and the inner periphery 25c of the temperature sensor insertion fit portion 25b. The temperature sensor 33 is thereby fixedly held favorably and may make secure contact with the inner periphery 25c of the temperature sensor insertion fit portion 25b, enabling it to desirably measure the temperature of the soldering tip 20. Therefore, when the soldering tip 20 is heated by the heater 30 fittingly inserted into the heater insertion fit portion 25a, electric power suitable for the heater 30 may be supplied so that the soldering tip 20 may be maintained at a desired temperature. Accordingly, a soldering iron may be obtained that may maintain a suitable temperature desirable for soldering when performing soldering work. Consequently, soldering work is easily performed.

While preferred embodiments of the invention have been described and illustrated above, it should be understood that these are exemplary of the invention and are not to be considered as limiting. Additions, omissions, substitutions, and other modifications may be made without departing from the spirit or scope of the present invention. For example, a material having excellent thermal conductivity was employed in the soldering tip of the soldering iron in the aforementioned embodiment. However, it is not limited thereto, and a suitable plating such as iron plating may be applied to the soldering tip with the objective of preventing solder leach. Also, the wire used for the heater is not limited to the aforementioned Kanthal wire, with a suitable chromium iron-base metal containing aluminum being selectable. In addition, any heater that generates heat by resistance and may have an insulating oxide film formed on the surface thereof may be used as a substitute. Accordingly, the invention is not to be considered as being limited by the foregoing description, and is only limited by the scope of the appended claims.

The invention claimed is:

1. A method of manufacturing a soldering iron provided with a soldering tip that melts solder at a distal end, comprising the steps of:
   providing a heater insertion fit portion which is a lengthwise cavity in said soldering tip and open at a proximal end of said soldering tip;
   providing a temperature sensor insertion fit portion in said soldering tip, the temperature sensor insertion fit portion being a lengthwise cavity in communication with a distal end of the heater insertion fit portion, and having an internal widthwise dimension, which is smaller than that of the heater insertion fit portion;
   providing a hollow elongate member in the heater insertion fit portion, which has an outer widthwise dimension larger than the internal widthwise dimension of the temperature sensor insertion fit portion;
   providing a hollow carrier portion so as to pass through the hollow elongate member and project from a distal end of the hollow elongate member into the temperature sensor insertion fit portion;
   inserting a heater into the heater insertion fit portion so as to be disposed between an outer surface of the hollow elongate member and an inner surface of the heater insertion fit portion; and
   providing a temperature sensor so as to pass through the hollow elongate member and contact with the inner surface of the temperature sensor insertion fit portion.

2. The method of manufacturing a soldering iron according to claim 1, the method further comprising the steps of:
constituting the heater by forming chromium iron-base metal containing aluminum into a coil shape; and
subjecting the heater to high-temperature oxidation by heating in a furnace at a prescribed temperature for a prescribed time.

3. The method of manufacturing a soldering iron according to claim 2, wherein said prescribed temperature of the furnace in said high-temperature oxidation step is 1100 to 1200° C.

* * * * *